United States Patent [19]

Nelle

[11] 4,400,880
[45] Aug. 30, 1983

[54] PRECISION MEASURING APPARATUS

[75] Inventor: Günther Nelle, Bergen, Fed. Rep. of Germany

[73] Assignee: Dr. Johannes Heidenhain GmbH, Traunreut, Fed. Rep. of Germany

[21] Appl. No.: 256,971

[22] Filed: Apr. 23, 1981

[30] Foreign Application Priority Data

May 2, 1980 [DE] Fed. Rep. of Germany ....... 3016908

[51] Int. Cl.³ ............................................ G01B 11/04
[52] U.S. Cl. .................................. 33/125 C; 33/1 M; 308/3 A; 308/6 R
[58] Field of Search ............. 33/125 C, 125 R, 125 A, 33/1 M; 308/3 A, 6 R; 356/383

[56] References Cited

U.S. PATENT DOCUMENTS

| | | | |
|---|---|---|---|
| 2,522,695 | 9/1950 | Walter | 308/6 R |
| 2,798,005 | 7/1957 | Love | 308/DIG. 7 |
| 2,844,416 | 7/1958 | Zaveruha | 308/3 A |
| 3,053,580 | 9/1962 | Bullard | 308/3 A |
| 4,068,906 | 1/1978 | Dur et al. | 308/3 A |
| 4,160,328 | 7/1979 | Ernst | 33/125 R |
| 4,189,840 | 2/1980 | Holstein | 33/125 C |

FOREIGN PATENT DOCUMENTS

| | | |
|---|---|---|
| 2706926 | 1/1978 | Fed. Rep. of Germany . |
| 2727769 | 5/1978 | Fed. Rep. of Germany . |
| 2643304 | 1/1980 | Fed. Rep. of Germany . |

*Primary Examiner*—William D. Martin, Jr.
*Attorney, Agent, or Firm*—Hume, Clement, Brinks, Willian & Olds, Ltd.

[57] ABSTRACT

A precision measuring apparatus (10, 10') includes a measuring scale (12, 12'), a scanning unit (15, 15') for scanning the scale (12, 12'), and a housing (11, 11') for supporting the scale (12, 12') and the scanning unit (15, 15'). The scanning unit (15, 15') rides on guide surfaces (16, 16', 17, 18) at least some of which are defined by flexible bands (19, 20, 28') that are loosely carried by grooves (21, 22, 29') defined by the walls of the housing (11, 11'). The bands (19, 20, 28') provide a relatively straight and smooth guiding arrangement for the scanning unit (15, 15') and they are preferably made of wear-resistant material such as steel. When the housing (11') is comprised of a plurality of housing sections (31'), the bands (19, 20, 28') are made in one piece and bridge the gap between the housing sections (31') without interruption.

10 Claims, 4 Drawing Figures

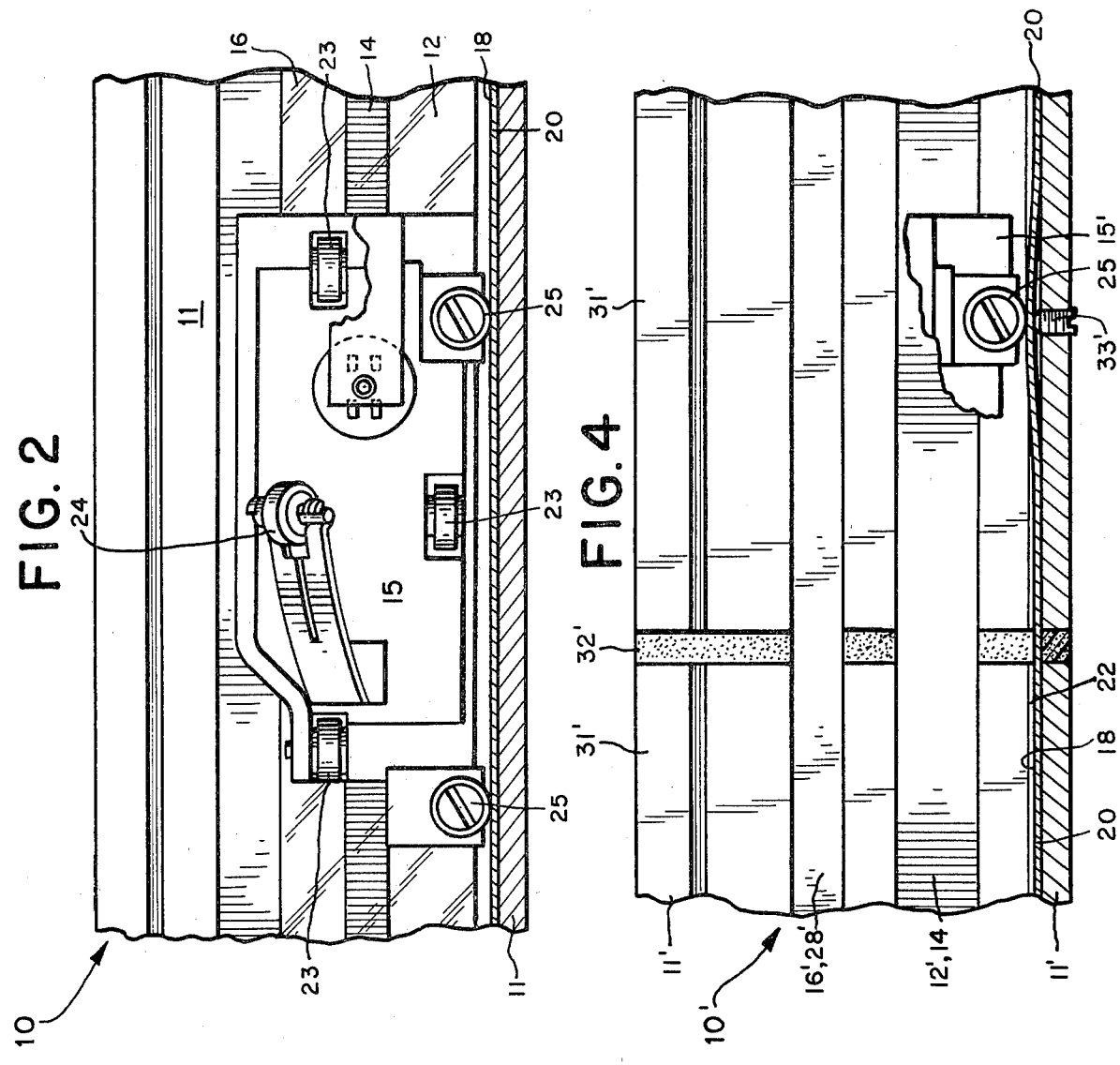
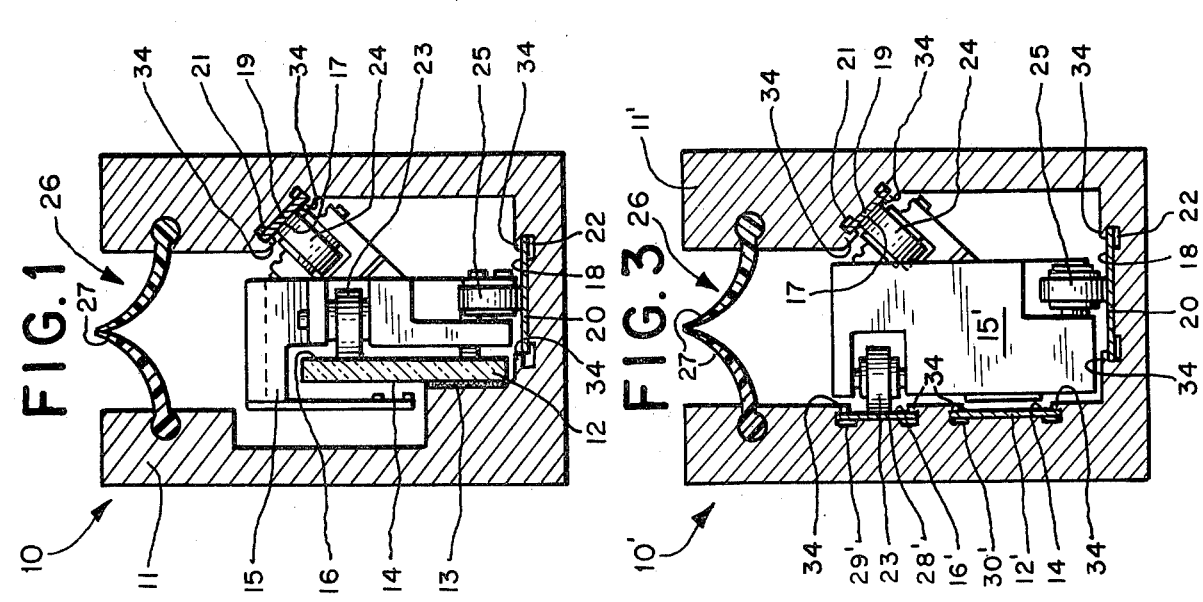

PRECISION MEASURING APPARATUS

BACKGROUND OF THE INVENTION

The invention relates to improvements in a precision measuring apparatus of the type having a measuring scale, a scanning unit for scanning the scale, and a housing for supporting the scale and the scanning unit.

Such measuring instruments are generally known in the art. For example, West German Patent Application AS No. 26 43 304 shows a length measuring apparatus which utilizes a rigid strip of glass to form a guide for the scanning unit. The glass strip is mounted to the apparatus housing by an elastic adhesive. Furthermore, West German Patent PS No. 27 27 729 discloses a measuring apparatus of the above type in which the scale is mounted on an intermediate carrier and forms therewith a guide surface for the scanning unit.

The known measuring instruments however have some disadvantages, including complicated construction and difficulty of adjustment. The disadvantages become specially noticeable when the distances to be measured are relatively large.

SUMMARY OF THE INVENTION

The invention is directed to an improved precision measuring apparatus having a measuring scale, a scanning unit for scanning the scale, and a housing for supporting the scale and the scanning unit, which apparatus avoids the disadvantages of the known measuring instruments. In particular, the invention is directed to improved means for guiding the scanning unit on the housing in an apparatus of the above type.

According to this invention, the improved measuring apparatus of the type indicated above includes at least one flexible band mounted on the housing, with each band defining a guide surface for guiding the scanning units along the scale. The at least one band is carried by at least one groove defined by the housing and adapted for this purpose. In some embodiments, the scale is also formed by a flexible band carried by a groove defined by the housing. The at least one flexible band is preferably carried loosely by the at least one groove, to provide some play, and consequently the possibility of relative movement, between each band and its associated groove. The at least one flexible band is preferably made of steel, and is preferably coated with a friction-reducing plastic. Where the housing is comprised of a plurality of housing segments arranged longitudinally end to end, each flexible band is preferably formed in one piece.

The improved measuring apparatus avoids many of the disadvantages of the known measuring instruments. The apparatus presents a relatively simple yet relatively easily adjustable construction. For example, the bands are relatively simple to mount in their carrying grooves by merely being inserted therein, and the guide surfaces defined by the bands may be adjusted in a direction perpendicular to the measuring direction by relatively simple means. Simultaneously, the apparatus provides a relatively straight and even guiding arrangement for the scanning unit, which guiding arrangement has good wear characteristics. A friction-reducing coating of the flexible bands reduces unwanted drag exerted upon the scanning unit by the guide surfaces. The provision of a loose fit between a flexible band and its carrying groove allows for flexing of the band for adjustment purposes, as well as allowing the bands to thermally contract or expand and thus to avoid deformations such as buckling of the bands. Steel bands provide excellent wear characteristics, as well as being economically available.

These and other advantages of the present invention will become apparent during the following description of the presently preferred embodiments of the invention.

BRIEF DESCRIPTION OF THE DRAWINGS

FIG. 1 is a lateral cross-section of a first preferred embodiment of the improved precision measuring apparatus;

FIG. 2 is a longitudinal cross-section of the apparatus shown in FIG. 1;

FIG. 3 is a lateral cross-section of a second preferred embodiment of the improved precision measuring apparatus; and FIG. 4 is a longitudinal cross-section of the apparatus shown in FIG. 3, with the scanning unit only partially represented.

DETAILED DESCRIPTION OF THE PREFERRED EMBODIMENTS

Turning now to the drawings, FIGS. 1 and 2 show a first preferred embodiment of the measuring apparatus of this invention, generally designated as 10. The apparatus is substantially enclosed in a hollow housing 11. A measuring scale 12 is mounted to a wall of the housing 10 by an elastic layer 13. The scale 12 defines divisions 14 which are scanned by a scanning unit 15. To ensure proper tracking and scanning of the scale 12 by the scanning unit 15, the scanning unit 15 is guided on guide surfaces 16, 17, and 18. A first guide surface 16 is defined by the scale 12. Second and third guide surfaces 17 and 18 are eached defined by a surface of flexible steel bands 19 and 20, respectively. The bands 19 and 20 are mounted in grooves 21 and 22, respectively, which are defined by the walls of the housing 11. Each groove 21, 22 has along its forward edges a pair of facing flanges 34 for retaining the respective band 19, 20 inside the groove.

The housing 11 is preferably made of a light metal by extrusion processes. Thus the necessity of forming the grooves 21 and 22 adds little to the manufacturing cost of the housing 11. The bands 19 and 20 are preferably mounted loosely in the grooves 21 and 22, to allow for relative movement, for example such as may be caused by thermal effects between the walls of housing 11 which define the grooves 21, 22 and the bands 19 and 20. The scanning unit 15 is equipped with rollers 23, 24, and 25, such as ball bearings, for riding on the guide surfaces 16, 17, and 18, respectively. Optionally, the rollers 23, 24, and 25 can be replaced by the slide shoes (not shown). To reduce friction between the rollers 24, 25 and the bands 19, 20, the bands 19, 20 may be covered with a friction-reducing, for example plastic, coating.

A wall of the housing 11 defines a longitudinal slit 26 oriented in the measuring direction which communicates with the outside of the housing and which provides access to the interior of the housing 11. The slit 26 is sealed by a pair of sealing lips 27. A coupling member (not shown) extends between the lips 27 through the slit 26 to provide an external mechanical connection to the scanning unit 15. Such coupling arrangements are known in the art and therefore need not be shown or discussed in detail.

The apparatus described above has the advantage, among others, that the flexible steel bands provide straight and even guide surfaces for the scanning unit which are resistant to wear. Thus the bands compensate for imperfections in the manufacture of the housing 11 and allow the housing to be made by cheaper, less exacting methods, and of cheaper materials.

FIG. 3 shows a second preferred embodiment of the measuring apparatus of this invention, generally designated as 10'. Many of the elements of the measuring apparatus 10' are the same as those of the measuring apparatus 10 shown in FIGS. 1 and 2, and they are designated by the same numbers. Elements of the embodiment of FIG. 3 which differ from the embodiment of FIGS. 1 and 2 are labeled with prime numbers.

In the measuring apparatus 10' of FIG. 3, scanning unit 15' is guided on guide surfaces 16', 17, 18, all of which are defined by flexible steel bands. Guide surface 16' is defined by band 28' which is carried by a groove 29' defined by a wall of the housing 11'. The band 28' is loosely mounted in the groove 29'. A wall of the housing 11' further defines a groove 30' adapted to carry scale 12'. The scale 12' is formed by a flexible steel band which carries the scale divisions 14. The scale 12' is also loosely mounted in the groove 30'. One end (not shown) of the scale 12' is mounted against longitudinal movement in the groove 30'.

This arrangement of the improved measuring apparatus has the additional advantage that thermally-induced relative length changes between the housing 11' and the scale 12' caused by the contraction or expansion of the scale 12' relative to the housing 11' can be accommodated without stretching or buckling of the scale 12', by movement of the scale 12' in the groove 30'. Thus thermally-induced measurement errors and possible damage to the scale 12' are avoided.

Furthermore, assuming that the housing 11' is mounted to one object and the scanning unit 15' is coupled to the second object of two objects whose relative displacement is to be measured (such as a bed and a slide piece of a machine) and that the two objects are made of steel, forming the scale 12' from a steel band has the advantage that the objects and the scale 12' undergo substantially equivalent thermally-induced length changes, and therefore no errors in measurement due to these length changes occur. The same holds true for other materials, as long as the objects and the scale 12' are made of the same material.

The housing 11' may be made in one piece. Alternatively, when measuring requirements call for a housing longer than a standard length, the housing 11' may be comprised of a plurality of housing segments 31' which abut longitudinally end on end and which are attached together by sealing elements 32', as shown in FIG. 4.

The individual housing segments 31' are mounted independently of each other to one of the two objects (not shown) whose relative displacement is to be measured, as disclosed in West German Patent PS No. 27 27 769. Gaps occur at the abutment of the segments 31', which gaps are filled by the sealing elements 32'. Nevertheless, errors in guidance of the scanning unit 15', and consequently measurement errors, can result from these gaps. Means exist for constructing the measuring apparatus 10' in such a way that these errors are eliminated, as disclosed in West German Patents PS No. 27 06 926 and PS No. 27 27 769.

Alternative means of eliminating the errors caused by the gaps between abutting housing segments 31' are provided by the present invention, as shown in FIG. 4. That Figure indicates that, unlike the housing 11', the scale 12' and the guide bands 19, 20, and 28' are each formed in a single piece. After the housing segments 31' which comprise the housing 11' are assembled, the scale 12' and the guide bands 19, 20, and 28' are inserted into their respective carrying grooves 30', 21, 22, and 29'. Being in one piece, the scale 12' and guide bands 19, 20, and 28' bridge the gaps between the housing elements 31' and thus provide uninterrupted scanning and guide surfaces. Adverse effects that the gaps may otherwise have on the guiding of the scanning unit 15' and on the scanning of the scale 12' are thereby eliminated.

The flexible bands 19, 20, and 28' are made to fit loosely into their respective grooves 21, 22, and 29' such that lateral play exists between the bands and the housing 11' wall surfaces which define the grooves. The lateral play allows the guide surfaces 17, 18 and 16' to be adjusted in a direction perpendicular to the measuring direction, by slightly deflecting in that same direction the bands 19, 20, and 28' which define the guide surfaces 17, 18 and 16'. Deflection of the bands 19, 20, and 28' is accomplished by adjusting elements 32', such as set screws, one of which is shown in FIG. 4. The elements 32' press on the bands 19, 20, and 28' to urge them out of their normal position in the direction of adjustment.

This arrangement has the advantage of providing an adjustment for minor deviations in the dimensions of the housing 11 and the like, which can cause tracking and measurement errors. Such adjustment is also useful for alignment purposes when the scale 12' carries in addition to the grid divisions 14 other markings with which the scanning unit 15' must be precisely aligned at predetermined positions. These markings can be, for example, zero impulse markings.

Of course, it should be understood that various changes and modifications to the preferred embodiments described above will be apparent to those skilled in the art. For example, the scale 12' may also define a guide surface. Or the flexible bands and the housing may be made of other suitable materials, such as plastic. Moreover, the invention may be used with any measurement detection mechanism, such as a photoelectric, optical, inductive or capacitive measuring system. These and other changes may be made without departing from the spirit and scope of the invention and without diminishing its attendant advantages. It is therefore intended that such changes and modifications be covered by the following claims.

I claim:

1. In a precision measuring apparatus comprising a measuring scale extending along a measuring direction, a scanning unit for scanning the scale, and a housing for supporting the scale and the scanning unit, the improvement comprising:
   at least one flexible band each defining a guide surface for guiding the scanning unit, said band being deflectable in a direction perpendicular to the measuring direction; and
   means, included in the housing, for defining at least one groove adapted to carry the at least one flexible band.

2. The apparatus of claim 1 wherein the housing is a hollow enclosure defining by its wall a longitudinal slit oriented in the measuring direction and communicating with the outside of the housing.

3. The apparatus of claim 1 wherein the housing is comprised of a plurality of housing segments arranged to abut longitudinally end on end, and wherein each of the at least one flexible bands is formed in one piece which extends along the plurality of housing segments.

4. The apparatus of claim 1 wherein the scale is defined by a flexible band and wherein the housing defines a groove adapted to carry the flexible band defining the scale.

5. The apparatus of claim 1 wherein the at least one flexible band is carried loosely by the at least one groove.

6. The apparatus of claim 1 further comprising adjusting means for deflecting the at least one flexible band.

7. The apparatus of claim 1 further comprising a friction-reducing plastic coating the flexible band.

8. The apparatus of claim 1 or 4 wherein the flexible bands are made of steel.

9. In a precision measuring apparatus comprising a measuring scale extending along a measuring direction, a scanning unit for scanning the scale, and a housing for supporting the scale and the scanning unit, the improvement comprising:

means, included in the housing, for defining a groove in an interior surface of the housing, which groove extends parallel to the scale along the measuring direction;

a flexible band disposed in the groove, said band defining a guide surface positioned and adapted to guide the scanning unit as it scans the scale, said band being carried loosely by the groove and said band being constructed such that the band is deflectable in a direction perpendicular to the measuring direction; and means for deflecting selected portions of the band perpendicularly to the measuring direction in order to adjust the position of the guide surface relative to the housing.

10. The apparatus of claim 9 wherein the housing comprises a plurality of housing segments arranged to abut longitudinally end to end, and wherein the band is formed in one piece which extends along the plurality of housing segments.

* * * * *